United States Patent [19]

Bruns

[11] Patent Number: 5,666,295
[45] Date of Patent: Sep. 9, 1997

[54] APPARATUS AND METHOD FOR DYNAMIC WEIGHING OF LOADS IN HYDRAULICALLY OPERATED LIFTS

[75] Inventor: Robert W. Bruns, Sacramento, Calif.

[73] Assignee: Sentek Products, Rancho Cordova, Calif.

[21] Appl. No.: 583,283

[22] Filed: Jan. 5, 1996

[51] Int. Cl.$^6$ .................................................. G01G 19/14
[52] U.S. Cl. .................... 364/567; 364/566; 364/568; 364/510; 414/21; 177/139; 177/140; 177/141; 701/50
[58] Field of Search ...................... 364/566–568, 364/572, 574, 148, 508–510, 505–506, 424.07, 465, 466, 550, 551.01, 558; 177/1, 139–141, 208, 209, 146, 147; 137/596.17; 414/21; 187/222–224, 229, 234, 237, 238

[56] References Cited

U.S. PATENT DOCUMENTS

| 4,635,739 | 1/1987 | Foley et al. | 177/208 |
| 4,824,315 | 4/1989 | Naab et al. | 177/141 |
| 4,854,406 | 8/1989 | Appleton et al. | 177/141 |
| 5,064,008 | 11/1991 | Smith | 177/1 |
| 5,065,828 | 11/1991 | Smith | 177/139 |
| 5,065,829 | 11/1991 | Smith | 177/139 |
| 5,105,895 | 4/1992 | Kyrtsos | 177/141 |
| 5,139,101 | 8/1992 | Smith | 177/139 |
| 5,195,418 | 3/1993 | Smith | 91/31 |
| 5,208,753 | 5/1993 | Acuff | 364/424.07 |
| 5,210,706 | 5/1993 | Nishiyama | 364/574 |
| 5,243,512 | 9/1993 | Putman et al. | 364/148 |
| 5,287,885 | 2/1994 | Smith | 137/596.17 |
| 5,327,347 | 7/1994 | Hagenbuch | 364/424.07 |
| 5,329,441 | 7/1994 | Aoki et al. | 187/224 |

OTHER PUBLICATIONS

"Lift Truck Scales" brochure, Weigh–Tronix, Inc., 2320 Airport Boulvard, P.O. Box 1501, Santa Rosa, CA 95402–1501.

*Primary Examiner*—James P. Trammell
*Assistant Examiner*—Hal D. Wachsman
*Attorney, Agent, or Firm*—Thomas Schneck; Kenneth C. Brooks

[57] ABSTRACT

A hydraulic lifting device, such as a forklift, is provided and is capable of dynamically measuring the weight of a load being lifted. A plurality of pressure measurements are taken during the lift for a period of time, which are stored in memory. A computer program is operated on by a microprocessor to process the pressure measurements to filter unwanted signals associated with vibration and other mechanical disturbances. The pressure samples processed by the computer program correspond to a portion of the lift during which acceleration of the forks has ceased, allowing a closer correspondence between the weight lifted and the pressure of the hydraulic fluid sensed.

29 Claims, 9 Drawing Sheets

APPARATUS AND METHOD FOR DYNAMIC WEIGHING OF LOADS IN HYDRAULICALLY OPERATED LIFTS

TECHNICAL FIELD

The present invention pertains to the field of weight sensing systems. Specifically, the present invention pertains to weight sensing system ideally suited for hydraulic lifting mechanisms.

BACKGROUND ART

In the past, there has been great interest in determining the load carried on trucks for hire. Loads carried by trucks are often supported by pallets, because pallets provide a stable platform on which to position and transport goods between trucks, using a hydraulic lifting device. Typically, prior art weight measurement devices were concerned with measuring the change in the gross weight of a truck to determine whether it complied with regulations relating to the loading of commercial motor vehicles and/or determining the amount to charge a customer for transportation of a particular load. This does not allow determining the weight of individual pallets of goods, before loading the pallets onto the truck, which may result in overloading of the same. To prevent overloading of the truck, the pallets of goods may be individually transported to a scale where they may be weighed. A problem with this procedure is that it is time consuming, resulting in increased transportation costs for a given load. An obvious solution to this problem would be to provide a scale for each truck receiving a load, thereby providing dynamic weighing of the total load of the truck as pallets of goods are placed thereon. This would require having a separate scale for each truck receiving pallets of goods, or creating a queue of trucks for each scale present so that each may, in turn, be placed on the scale during loading. Both of these solutions result in the same drawbacks as individually weighing pallets of goods. Alternately, the pallets of goods may be weighed by the hydraulic lifting device used to move the pallets to and from the trucks.

Prior art attempts have been made for dynamically weighing loads moved by hydraulic lifts. Weigh-Tronix, Inc. describes, in a sales brochure, a device for dynamically weighing loads supported by a forklift. The Weigh-Tronix device includes a large frame fitting between a carriage and a pair of forks. The frame is mounted parallel to the carriage and includes upper and lower spaced apart plates, extending parallel to, and contiguous with, the carriage along a first direction. The plates are joined by flexible members, extending perpendicular to the first direction, parallel to the carriage. The forks are "L" shaped with a first portion mounted to the upper plate and extending parallel thereto, terminating in a lower portion, proximate to the lower plate. The lower portion extends orthogonally from the lower plate. Deflection of the flexible members is proportional to a weight disposed on the forks. A drawback with the Weigh-Tronix device is that its weight is excessive, making is difficult to install and costly to manufacture, as well as to transport to an end user. In addition, the accuracy of the Weigh-Tronix device degrades over time due to fatiguing of the flexible members, which, if overloaded, will permanently deform, making the device susceptible to premature failure.

To overcome the excessive weight of the frame in the Weigh-Tronix device, prior art devices have placed a weight transducer in the hydraulic lift circuit. In this manner, a portion of the hydraulic fluid is transmitted along a bypass from the main lift circuit, where the transducer is positioned, to measure the pressure of the fluid in the bypass. U.S. Pat. Nos. 5,287,885; 5,195,418; and 5,139,101 to Smith each discloses such a bypass system. Specifically, a motion control system for hydraulically operated lifting devices is shown including, in pertinent part, a two-way valve having a normally open valve in one chamber and a normally closed valve in another chamber. The normally open valve may be closed to re-direct flow of hydraulic fluid from a main valve under pressure from a hydraulic pump to a bypass chamber having a flow control valve. The normally closed valve may be opened to direct flow from a lift circuit of a second flow control valve to pass the hydraulic fluid back to a hydraulic fluid reservoir tank. The operation of opening and closing the aforementioned valves makes different flow paths for the hydraulic fluid so as to more closely control the ascent and descent of a load being displaced.

U.S. Pat. Nos. 5,065,829; 5,065,828; and 5,064,008 to Smith each discloses a hydraulic control system for weighing including, in pertinent part, a bypass control system that slowly releases hydraulic fluid from a lift circuit to direct it back to a reservoir in a controlled manner. This allows a load to be smoothly moved from a reference position to a weighing position, reducing the degradation of the measurement's accuracy due to vibration and shaking.

U.S. Pat. No. 5,327,347 to Hagenbuch discloses a method and apparatus for accurately measuring haulage parameters including, in pertinent part, a processing unit in electrical communication to receive signals from a plurality of pressure transducers. Each of the pressure transducers transmits signals to the processing unit corresponding to the weight of load present thereon, establishing a historical data base reflecting the vehicle operating conditions. To obtain an accurate weight measurement, the processing unit reads the pressure measurement from each transducer sixteen times and averages the sixteen measurements together. The remaining transducers are each, in turn, measured sixteen times with the readings averaged. After all the readings from each transducer is averaged, the averaged readings are then summed and averaged, providing a net average measurement of the pressure from all of the transducers. The net average measurement corresponds to the weight of the load on the vehicle.

U.S. Pat. No. 5,210,706 to Nishiyama discloses a device for measuring weight including a plurality of load cells. Signals transmitted by the load cells represent pressure changes which correspond to the weight of a load to which the load cells are subjected. The signals are sent to analog-to-digital converters where they are digitized. Low frequency noise components are reduced by digital filters in electrical communication with the analog-to-digital converters. The reduced noise signals are then summed to provide weight data.

U.S. Pat. No. 5,243,512 to Putman et al. discloses a method and apparatus for minimizing vibration including, in pertinent part, a plurality of accelerometers and actuators, with the accelerometers attached to a system of interest producing vibrations. The accelerometers detect vibration and produce electrical signals corresponding thereto. A processor is coupled to receive the electrical signals and measures the vibrational characteristics of the system using one of three algorithms. The processor then directs the actuators attached to the system to provide a compensating force, thereby minimizing the vibrational characteristics of the system.

A problem with the aforementioned devices is that the accuracy of a weight measurement is degraded due to various mechanical disturbances such as shaking and vibration, as well as pressure surges in the hydraulic fluid. These environmental disturbances substantially degrade the accuracy of the weight measurement.

What is needed is a hydraulic lifting device capable of obtaining a high precision weight measurement, dynamically, without degradation of the measurement's accuracy by vibration, shaking or other mechanical disturbances.

SUMMARY OF THE INVENTION

A hydraulic lifting device, such as a forklift, is provided and is capable of measuring the weight of a load being lifted to an accuracy of less than 1% within 2.5 seconds after the commencement of the lift. A plurality of pressure measurements are taken during the lift for a period of time, referred to as a sampling period. The pressure measurements are then stored in memory with each pressure measurement corresponding to a unique increment of time during the sampling period. A computer program is operated on by a microprocessor to process the pressure measurements separated by a predetermined range of increments to filter unwanted signals associated with vibration and other mechanical disturbances. The pressure samples processed by the computer program correspond to a portion of the lift during which acceleration of the forks has ceased, allowing a closer correspondence between the weight lifted and the pressure of the hydraulic fluid sensed.

The forklift is a conventional type with the forks mounted to a carriage and the carriage movably mounted to a mast. Lift-chains are attached to the carriage and extend over sprockets which are positioned proximate to one end of the mast. A hollow cylinder housing a piston and hydraulic fluid is attached to the mast. The piston is operationally connected to the sprockets so that movement of the housing causes the carriage to be moved along the mast. Hydraulic fluid is disposed between the piston and one end of the housing having an aperture, with the piston imparting a force upon the hydraulic fluid proportional to a weight associated with the forks. A hydraulic control system is in fluid communication with the aperture to regulate ingress and egress of the hydraulic fluid with respect to the cylinder. A pressure transducer is in fluid communication with the cylinder via a bypass in which a portion of the hydraulic fluid moving to and from the cylinder is present. The pressure transducer measures the pressure of the hydraulic fluid and creates electrical signals corresponding to the same. The electrical signals are transmitted to processing circuitry as a data stream of digital signals. Processing circuitry is coupled to receive the digital data stream and produces information corresponding to hydraulic pressure, including the weight of a load supported by the forks.

The digital data signals correspond to a plurality of pressure measurements obtained during a fixed period of time of the lift. The processing circuitry includes a microprocessor and first and second memory elements, with the plurality of pressure measurements stored in the second memory element. A program is stored in the first memory element. The microprocessor operates on both the first and second memories causing the program to process the plurality of pressure measurements to determine the weight of the load on the forks. The program includes a plurality of subroutines (algorithms). A first sub-routine functions as an accelerometer and determines at which point during the lift an acceleration of the forks has ceased. The program includes second and third sub-routines which are subsumed in the first sub-routine. The second sub-routine functions as a movement detector to ascertain whether the forks are stationary. A third sub-routine functions as a pressure sensor and determines whether a load is present on the forks. After determining the pressure associated with the total load pressure, the tare of the forks are subtracted, providing the net pressure of the load supported by the forks, from which the load weight may be determined.

BEST MODE FOR CARRYING OUT THE INVENTION

Figure 1:
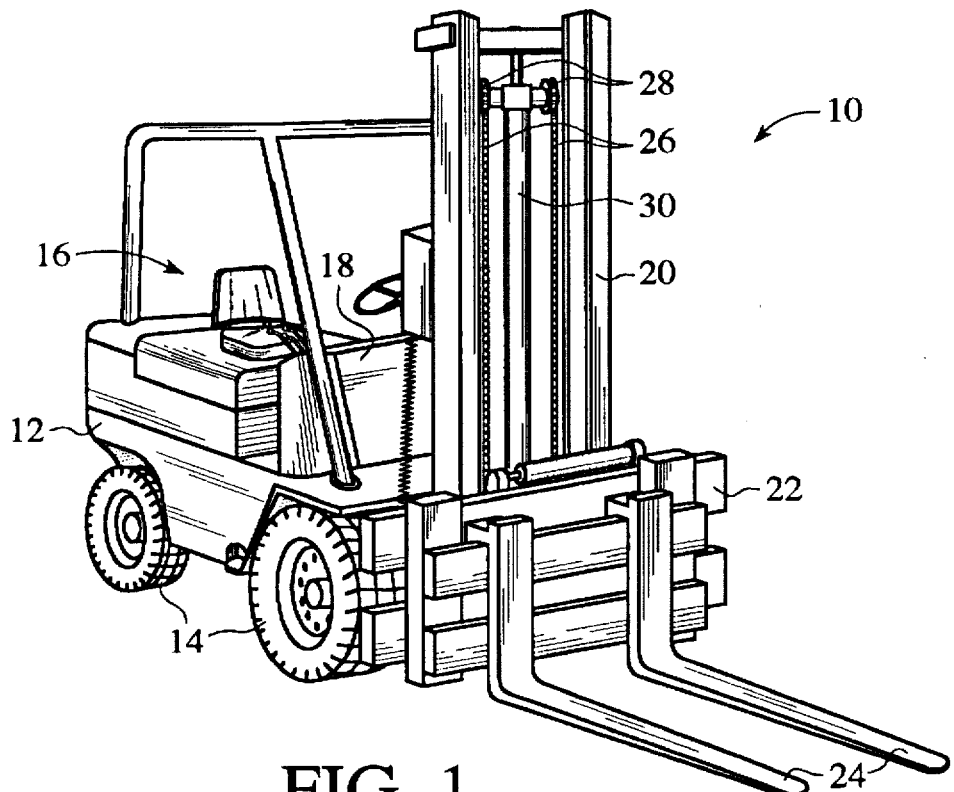
FIG. 1 is a perspective view of a forklift employing the present invention.
Figure 2:
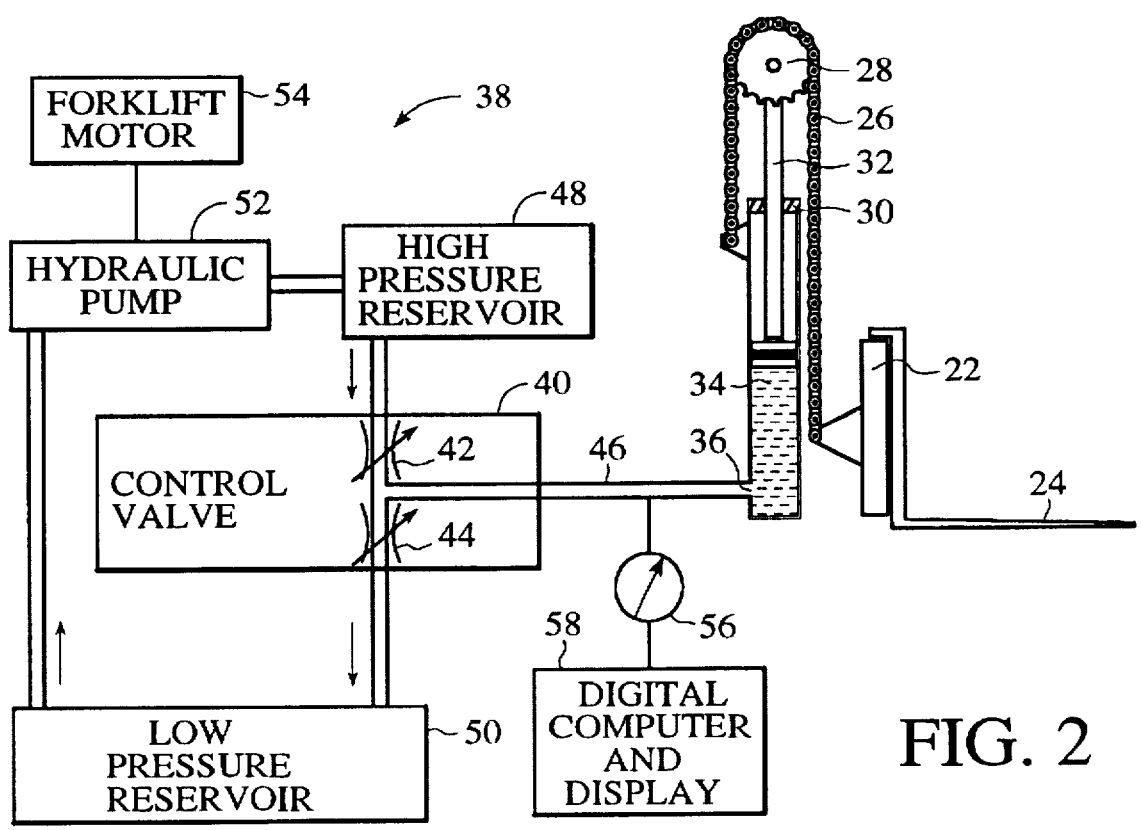
FIG. 2 is a simplified schematic view of a hydraulic system in accord with the present invention.

Referring to FIGS. 1 and 2, the present invention may be mounted and used on a number of different hydraulic lifting devices. For the purposes of this discussion, however, the present invention will be described with reference to a conventional forklift 10 having a main body 12 supported by a plurality of wheels 14 including an operator compartment 16 having a control console 18 to control the operation of the forklift 10. Attached proximate to the control console 18 is a vertically extending mast 20. A carriage 22 is movably attached to the mast 20 and includes a plurality of forks 24, extending perpendicular from the mast away from the control console 18. Lift-chains 26 are attached to the carriage 22 and extend over sprockets 28 which are positioned proximate to one end of the mast 20, opposite to the plurality of wheels 14. A hollow cylinder 30 housing a piston 32 and hydraulic fluid 34 is attached to the mast 20, with one end of the lift-chains being attached to the cylinder 30. The piston 32 is connected to the sprockets 28 and movement of the cylinder 30 causes the carriage 22 to move along the mast 20.

Hydraulic fluid 34 in the cylinder 30 is disposed between the piston 32 and one end of the cylinder 30 having an aperture 36, with the piston 32 imparting a force upon the hydraulic fluid 34 proportional to a weight associated with the forks 24. A hydraulic control system 38 is in fluid communication with the aperture to regulate ingress and egress of the hydraulic fluid 34 with respect to the cylinder 30. The control system 38 includes a control valve 40, high 48 and low 50 pressure reservoirs, hydraulic pump 52 and forklift motor 54. Control valve 40 has first 42 and second 44 valve elements, both of which are connected to aperture 36 via fluid line 46. High pressure fluid reservoir 48 is in fluid communication with valve element 42, and low pressure fluid reservoir 50 is in fluid communication with valve element 44. Valve elements 42 and 44 allow the fluid line 46 to be selectively placed in flow communication with high 48 and low 50 pressure reservoirs, respectively. Hydraulic pump 52 is connected between the high pressure 48 and low pressure 50 reservoirs and is powered by the forklift motor 54. Upon opening valve element 42, hydraulic fluid flows from the high pressure reservoir 48 to enter the cylinder 30. This moves piston 32 away from aperture 36 causing lift-chains 26 to raise the carriage 22 toward the sprockets 28. Lowering the carriage 22 is achieved by closing valve element 42 and opening valve element 44, allowing hydraulic fluid 34 to exit cylinder 30 and enter low pressure reservoir 50. To measure the pressure of the hydraulic fluid 34 in the cylinder 30, a pressure transducer 56 is placed in fluid communication with fluid line 46, and a digital computer and display 58 is in electrical communication with the pressure transducer 56 to determine, from the fluid 34 pressure, the weight of a load on the forks 24.

Figure 3:
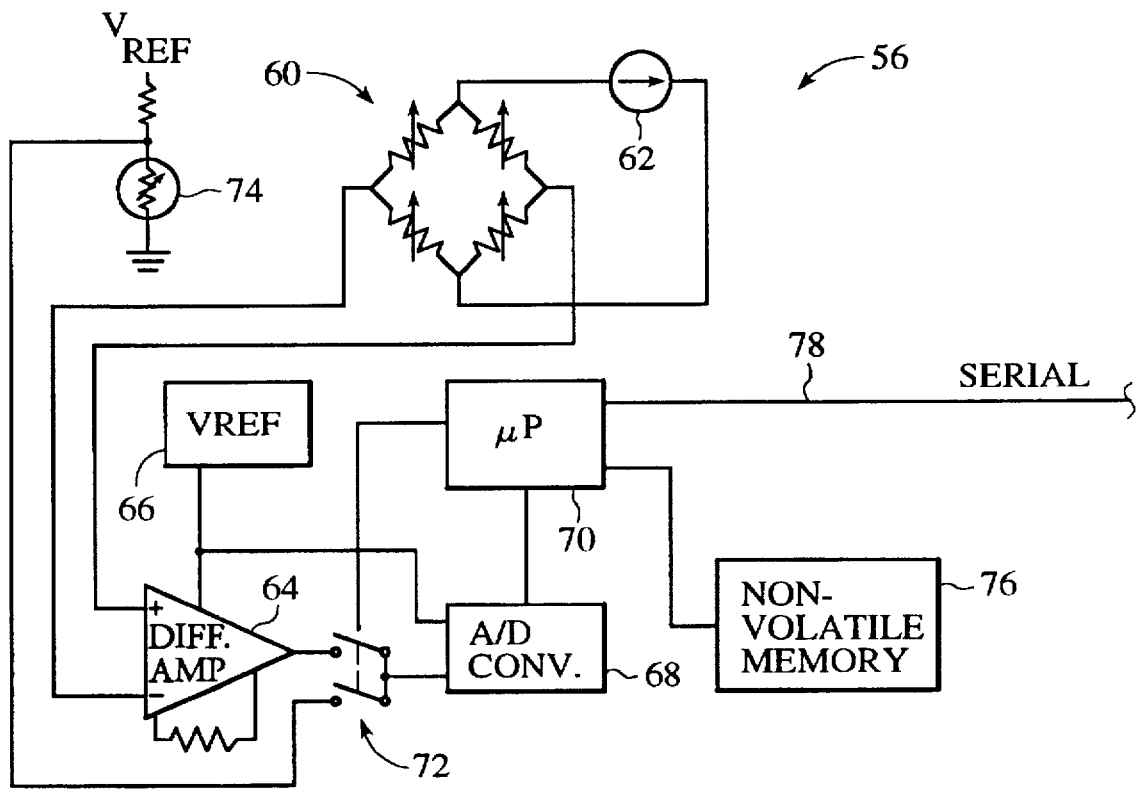
FIG. 3 is a block diagram of a pressure transducer shown in FIG. 2, in accord with the present invention.

Referring also to FIG. 3, the pressure transducer 56 is shown as having a silicon based piezo-resistive transducing unit 60 in a Wheatstone bridge configuration. A current source 62 is coupled to supply between 1 and 1.5 mA of current to the transducing unit 60. A change in pressure experienced by the transducing unit 60 results in a proportional change in a voltage measured at unit 60's output, which is coupled to a differential amplifier 64. The output of the transducing unit 60 may range from 0 to 100 mV, corresponding to a range of pressures from 0 psi to 5000 psi. The output of the transducing unit 60 is amplified by amplifier 64 and fixed to a rail voltage $V_{REF}$ supplied by a voltage reference circuit 66. In this manner, the output of amplifier 64 is fixed between 0 and 5 volts. The output of amplifier 64 is coupled to an analog-to-digital converter 68 which digitizes the amplified signal and produces a 12 bit binary number, ranging from 0 to 4096. The range of the binary numbers corresponds to the full scale of voltage, i.e. 0 to 5 volts. The output of the converter 68 is coupled to a microprocessor 70. A switch 72, disposed between the amplifier 64 and the converter 68, is under control of the microprocessor 70 to essentially provide a second input to the analog-to-digital converter 68. Coupled to one pole of the switch is a thermistor 74 positioned to measure the ambient temperature of the pressure transducer 56 and fluid 34. In this manner, the measurements made by the transducing unit may be compensated to overcome the consequences of the transducing unit's temperature characteristics. Connected to the microprocessor 70 is a non-volatile memory element 76 which stores the temperature characteristics of the transducing unit 60. For example, both magnitude and the zero offset of the output from transducer unit 60 varies with temperature. The changes are calculated using a three point curve fitting algorithm, and the constants associated with the calculation are stored in memory element 76. The output of the pressure transducer 56 is typically a digital data stream transmitted in serial format at 9600 baud, along line 78.

Figure 4:
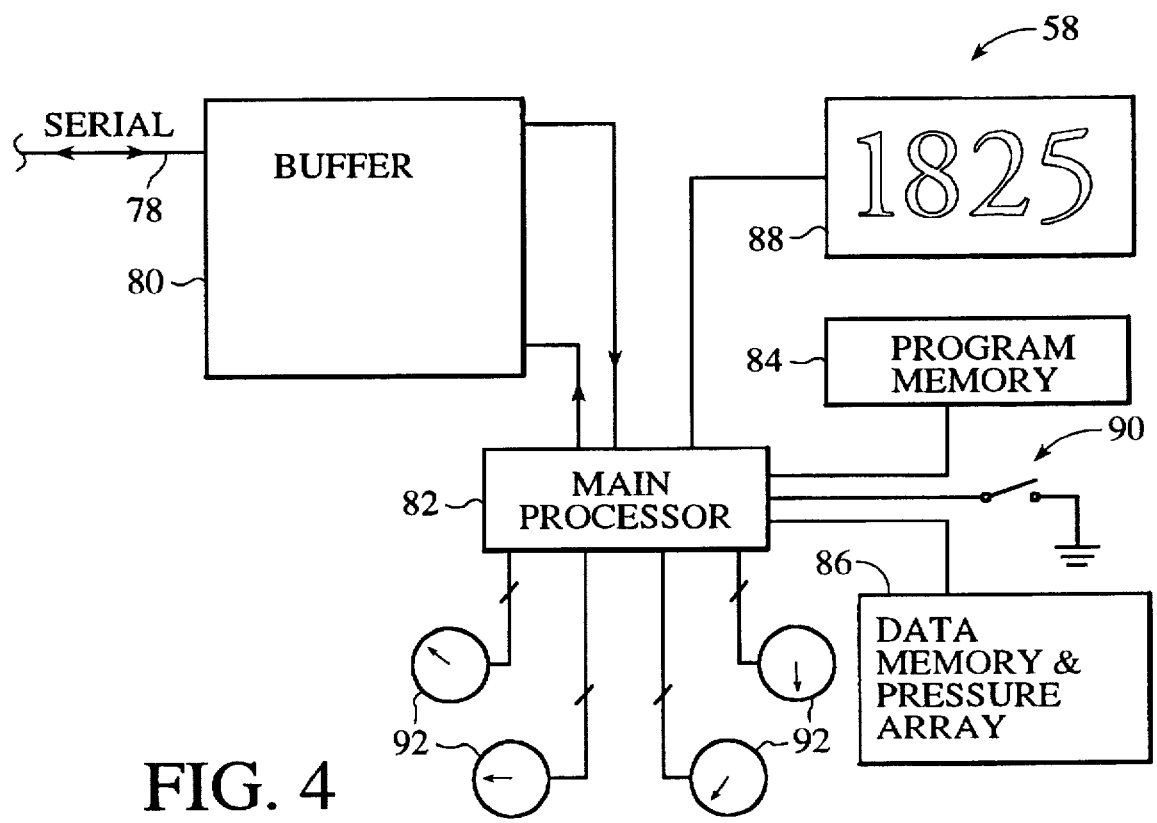
FIG. 4 is a block diagram of processing circuitry shown in FIG. 2, in accord with the present invention.
Figure 5A:
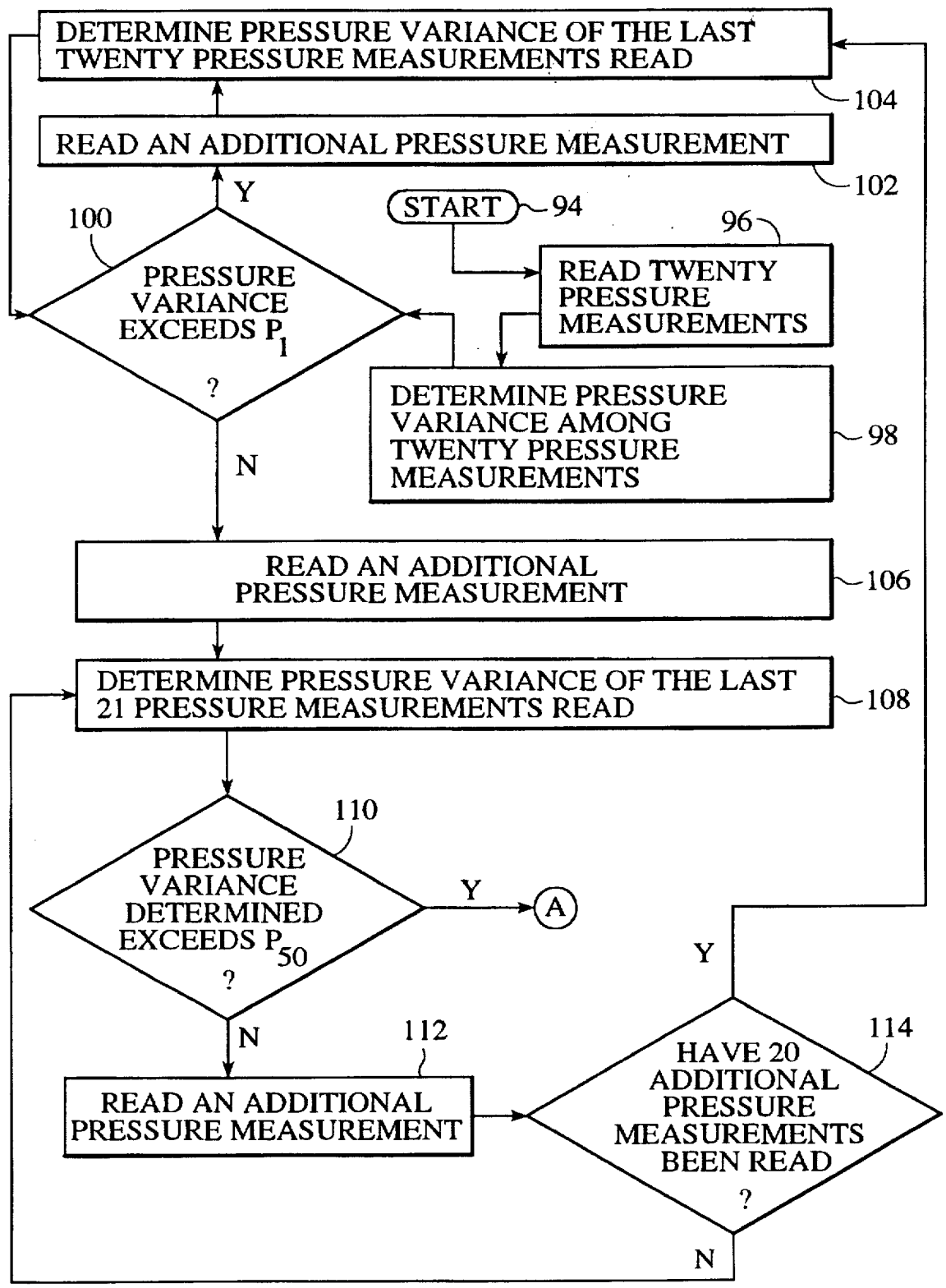
FIGS. 5A–5C is a flow chart showing the operation of a computer program for determining the weight of a load lifted by the forklift shown in FIG. 1, in accord with the present invention.
Figure 5B:
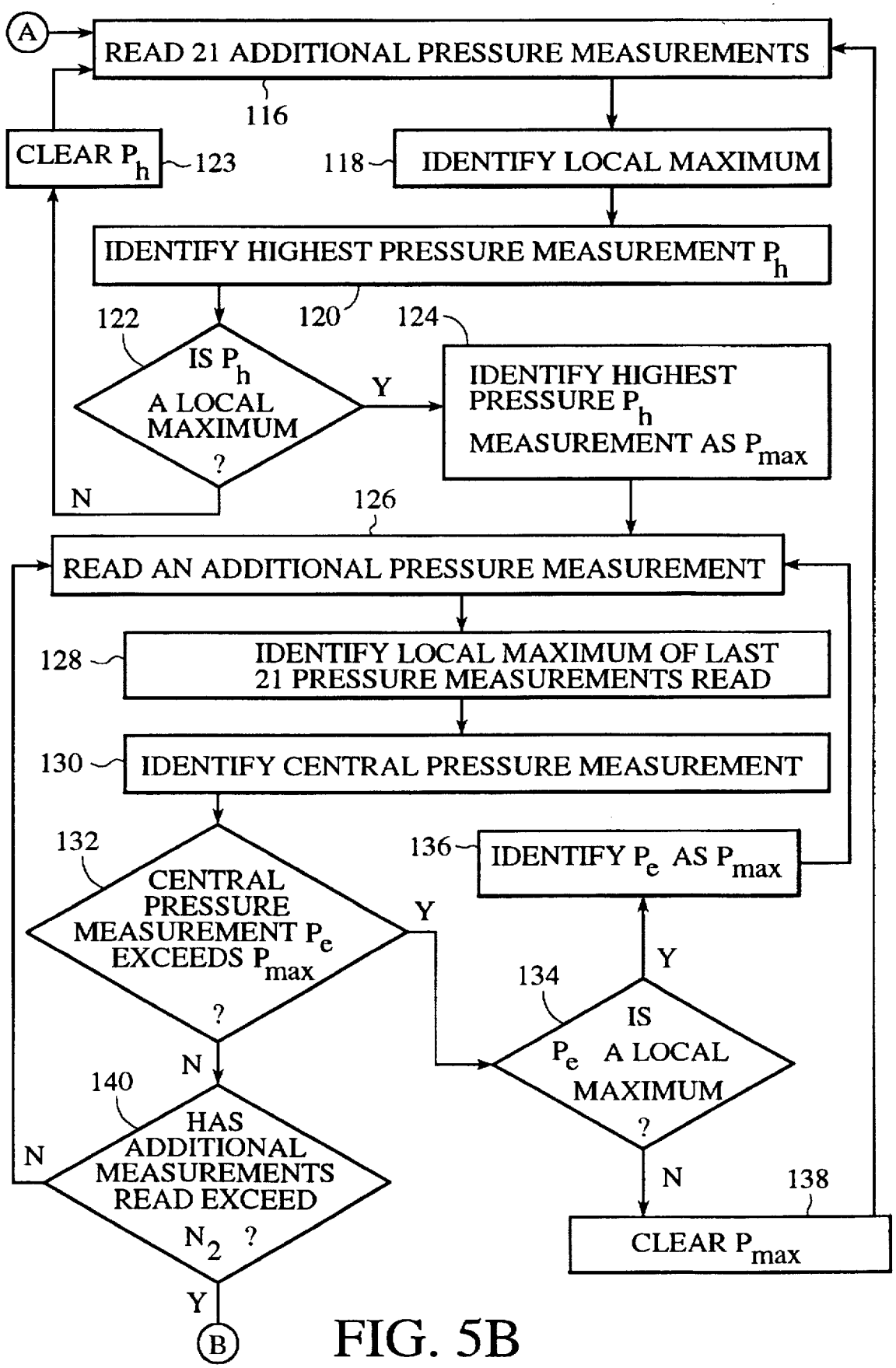
Figure 5C:
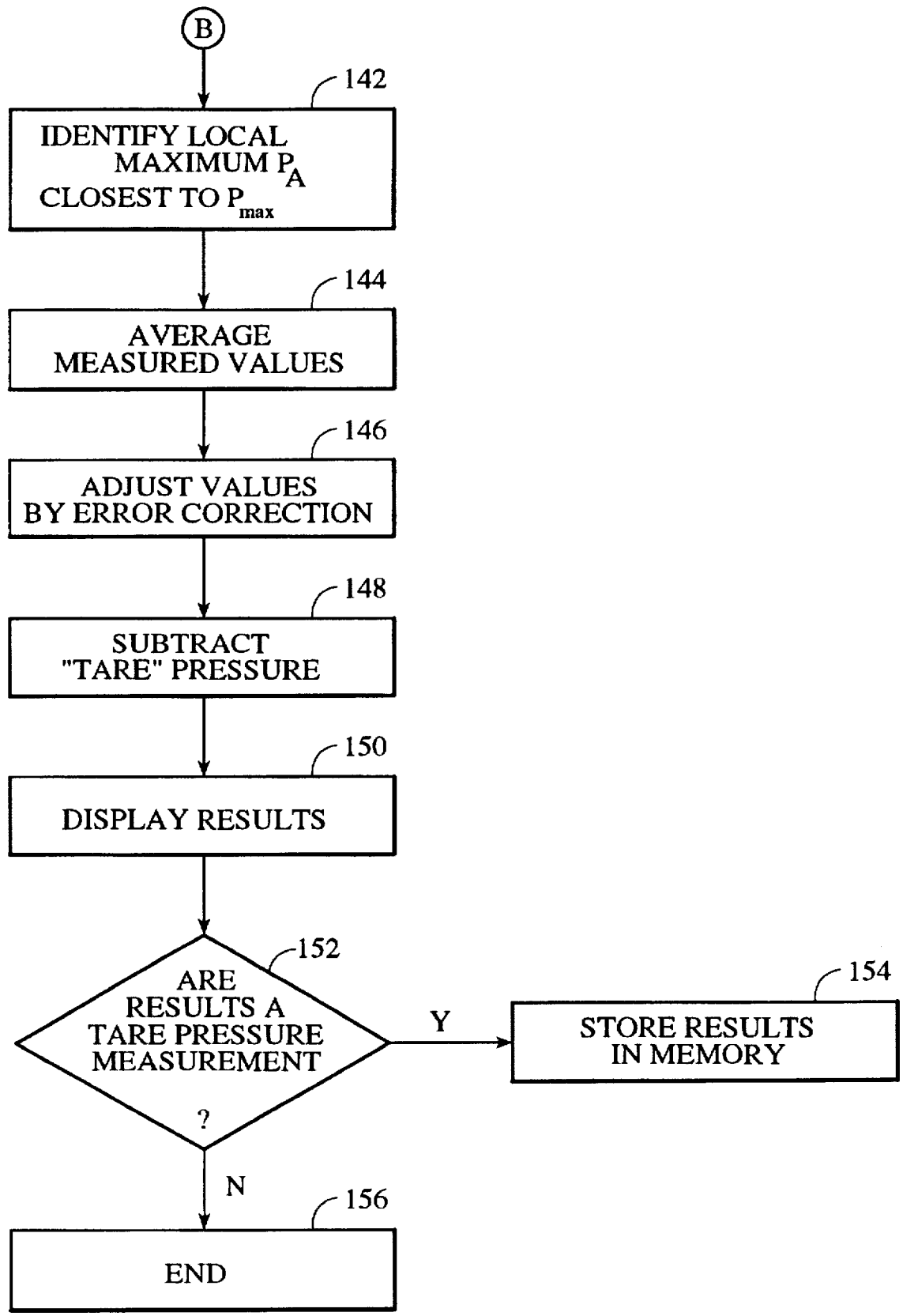

Referring also to FIG. 4, the digital computer and display 58 is shown as including a buffer 80 coupled to line 78 to receive the digital data stream from the pressure transducer 56. The output of the buffer 80 is coupled to the main processor 82. The main processor 82 controls the operations of the pressure transducer 56 via microprocessor 70, including the conversion of data by converter 68 and relay of the converted data to buffer 80. Coupled to the main processor 82 are first 84 and second 86 memories. The first program memory typically stores the program used to determine the weight from the pressure data relayed from the pressure transducer 56, discussed more fully below with respect to FIGS. 5A–C and 6. The program is typically stored in a read only memory, but any type of storage device may be employed. Second data memory stores the data corresponding to measurements of the pressure of the fluid 34 in the cylinder 30. Typically, the main processor 82 drives the pressure transducer 56 to take approximately 120 pressure measurements per second during a predetermined time period referred to as a sampling period. The sampling period is typically on the order of two to three seconds. Although any size memory may be employed, data memory 86 is configured to store at least twenty seconds worth of data. It is a circular buffer so that data may be automatically overwritten upon commencement of a new sampling period. In this fashion, data memory 86 stores a sequence of pressure measurements, with each measurement corresponding to a unique increment of time in the sequence. Each increment is associated with a unique address in the data memory 86. An example of a sequence of pressure measurements is shown as 146 in FIG. 6, discussed more fully below.

Referring again to FIG. 4, a display 88 is also included to provide a visual representation of the weight of a load present on the forks 24. A switch 90 is provided to obtain a tare weight at the forks 24, i.e. when the forks 24 are empty. Finally, a plurality of switches 92 are operationally coupled to the main processor 82 that enables a user to enter the dimensions of the cylinder 30 and piston 32, thereby calibrating the digital computer and display 58.

Absent vibration and other mechanical disturbances, the weight of a load supported by forks 24 is determined as a function of the fluid 34 pressure in the cylinder 30 as follows:

$$P = (W/gA)\frac{d^2X}{dt^2} + B\frac{dx}{dt} + W/A$$

where W is the weight of the total load; A is the effective area of the piston 32; g is the acceleration of gravity; $d^2x/dt^2$ is the acceleration of the forks 24; B is a frictional constant of the piston seal; and dx/dt is the velocity of the forks. Once the total weight W is determined, the tare weight $W_T$ of the forks 24 is subtracted from the total weight, providing the weight of the load lifted. The tare weight $W_T$ may either be determined in advance and recorded in program memory 84, or it may be determined as described below with respect to FIG. 5. Fluid pressure in the housing is proportional to the seal resistance, which in turn is proportional to the velocity of the movement of the carriage 22 along mast 20. For example, the faster the piston 32 is displaced with respect to cylinder 30, the higher the pressure measurement at pressure transducer 56 for a given weight. To overcome this effect of the seal resistance, it is necessary to measure pressure while the velocity of the carriage is constant. To that end, pressure measurements must be made when acceleration of the carriage 22 along the mast 20 has ceased.

Referring also to FIGS. 5A–C and 6, a process program stored in program memory 84 is employed to process a data stream in real time, thereby determining when the acceleration of the carriage 22 has ceased. At the start step 94, the main processor 82 operates on the program to access data, determining a baseline indicating that a lift has begun. To achieve this, steps 96, 98 and 100 ascertain increments of time in the sequence 146 corresponding to a stationary position of the forks 24. Typically, twenty pressure measurements will be read from data memory 86 at step 96. At step 98, the absolute value of the maximum pressure variance between any two pressure measurements is determined. At step 100, the program determines whether the pressure variance among the twenty pressure measurements exceeds pressure level $P_1$. Pressure level $P_1$ lies within a predetermined range, typically zero to seven pounds per-square-inch. If the twenty pressure measurements do not exceed $P_1$, the program will determine that the forks are stationary and proceed with step 106. If the program determines that the variance exceeds $P_1$, then the forks are not stationary, causing the program to proceed with step 102. At step 102, an additional pressure measurement is read, which corresponds to an additional increment of time in sequence 146. At step 104, the pressure variance among the last twenty pressure measurements is determined, at which point step 100 is again repeated. Steps 100, 102 and 104 are repeated until the conditions of step 100 are satisfied, i.e., until the absolute value of the pressure variance in twenty samples is less than $P_1$.

During step 106, an additional pressure measurement is read, which corresponds to an additional increment of time in the sequence 146. At step 108, the program determines the variance between the last twenty pressure measurements read, at step 104, and the additional pressure measurements read at step 106. At step 110, the program determines whether the variance measured at step 108 exceeds a pressure level $P_{50}$, which is typically fifty pounds per-square-inch. If not, then an additional pressure measurement may be read at step 112, at which point the program determines whether twenty additional pressure measurements have been read at step 114. If not, steps 108, 110, 112 and 114 are repeated until the conditions of step 110 are satisfied. After step 114 indicates that twenty additional pressure measurements have been read, the program returns to step 104, where the program searches for a new baseline. If the parameters of step 110 have been satisfied, then the starting point of the lift is identified, shown as A on sequence 146, and the program proceeds to step 116.

At step 116, twenty-one additional increments of pressure measurements are read following the increment of the last pressure measurement read at step 112. At step 118, the local maximum of the pressure measurements read at step 116 is identified. At step 120, the program identifies the highest pressure measured, $P_h$, among the pressure measurements read at step 116, and at step 122, it is determined whether $P_h$ is a local maximum.

If $P_h$ is a local maximum, the program identifies the measurement as $P_{max}$. If $P_h$ is not a local maximum, $P_h$ is cleared at step 123, and steps 116, 118 and 120 are repeated until $P_h$ is identified as a local maximum at step 122. Upon identifying $P_h$ as $P_{max}$, an additional pressure measurement is read, and the local maximum among the last twenty-one pressure measurements is identified at steps 126 and 128. At step 130, the program identifies the central pressure measurement $P_e$ among the last twenty-one read, i.e., the pressure measurement read at step 126 located so that ten pressure measurements before and after $P_e$ are read. At step 132, the program determines whether the central pressure measurement $P_e$ exceeds $P_{max}$ so, step 134 determines whether $P_e$ is a local maximum. At step 136, $P_e$ is identified as $P_{max}$ if it is a local maximum, thereby erasing the previous $P_{max}$ identified at step 124. Thereafter, the program repeats steps 126, 128, 130 and 132. If $P_e$ is not a local maximum, $P_{max}$ is cleared, and the program returns to step 116. In this fashion, the program dynamically determines $P_{max}$ as it reads the pressure measurements from memory 86. $P_{max}$ is shown on sequence 146 and represents the increment at which the effects of acceleration, pressure surges and other mechanical disturbances are maximized. Pressure measurements are analyzed following the increment during the sequence 146 at which the effects of acceleration are maximized. $P_{max}$ is an important parameter to identify because at increments subsequent to $P_{max}$ the velocity of the carriage 22 on the mast 20 is constant. Measuring the pressure when the velocity of the carriage 22 is constant provides a more accurate pressure measurement.

If $P_e$ does not exceed $P_{max}$ at step 132, the program will repeat steps 126, 128 and 130 until $N_2$ additional pressure measurements have been read. Typically, $N_2$ is approximately 240 pressure measurements, although any number may suffice. From this, an accurate weight measurement may be made. The local maxima identified in the sequence following $P_{max}$ are important to filter unwanted mechanical disturbances which affect the accuracy of the measurement. Specifically, it was recognized that certain mechanical disturbances manifested in sequence 146 as vibrational frequencies. A dominant frequency from 5 to 10 Hz and a subdominant frequency of 20 to 50 Hz is found to be modulated onto sequence 146. The dominant frequency is believed to be caused by stretch in the lift-chain 26 and caused as much as a 20% error in the measurement of weight. The program filters the unwanted frequencies by separating the first local maximum from $P_{max}$ by at least 10 increments (0.08 second). Subsequent local maxima must be spaced by the same amount from an adjacent local maximum among the 240 additional pressure measurements.

Figure 6:
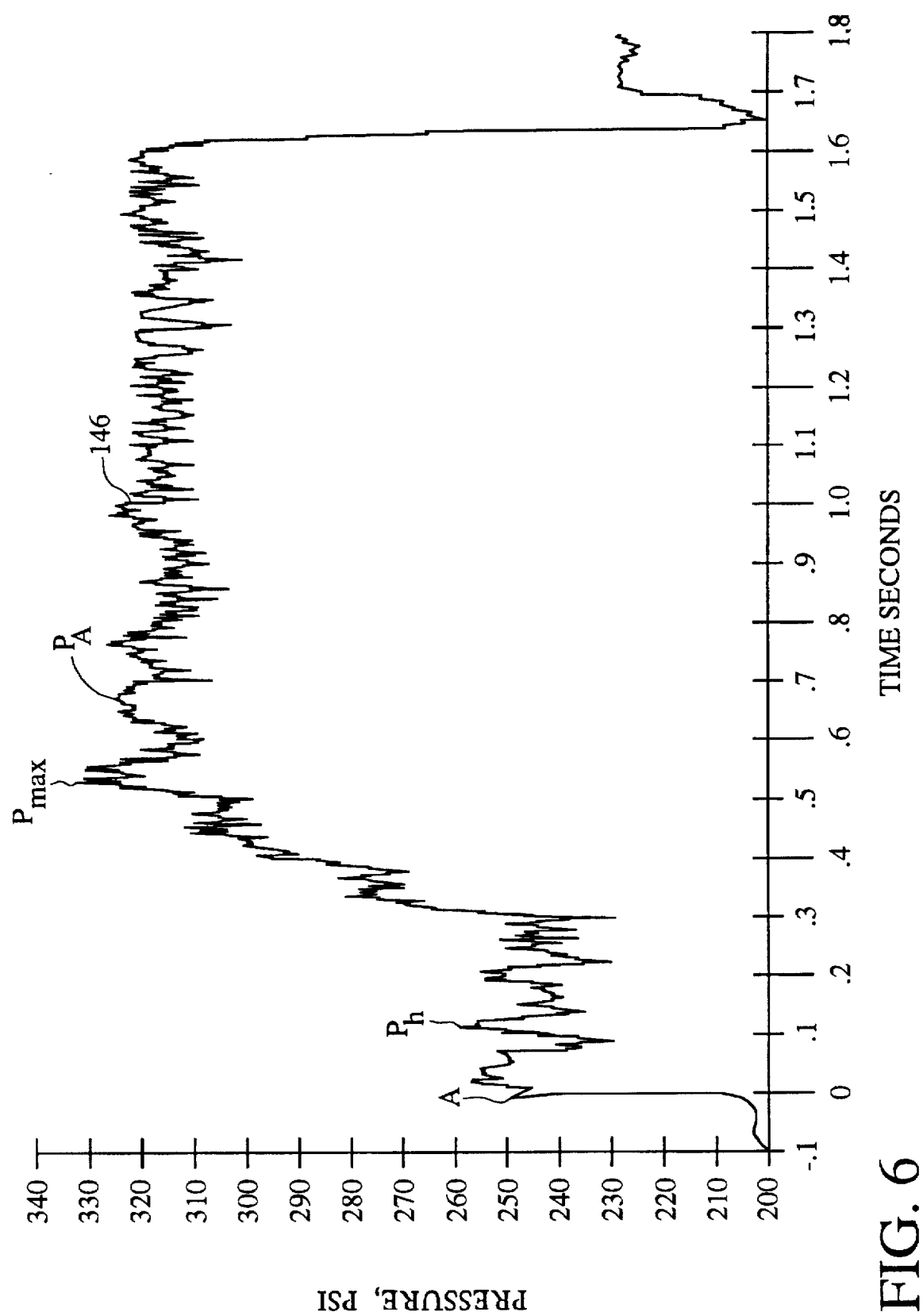
FIG. 6 is a graph of time versus pressure of sample measurements observed, employing the present invention in the forklift of FIG. 1 while lifting a load.

To determine a local maximum, a sub-set of twenty-one increments of pressure measurements are read, with the pressure measurement closest to the previous local maximum being separated by at least ten increments. From the subset of increments, the highest pressure level detected is identified as a local maximum. This iteration is repeated over the sequence of increments following $P_{max}$. At step 142, the closest local maximum following $P_{max}$ is identified as $P_A$, which represents the increment during the lift at which the velocity of the carriage 22 is no longer changing and the vibrational and pressure characteristics of the system have stabilized. The remaining local maxima are identified as $P_1$, $P_2$, $P_3$ . . . $P_N$, which, when coupled with $P_A$, define the remaining sequence. As shown in FIG. 6, $P_{max}$ corresponds to increment 108 and local maxima $P_A$, $P_1$, $P_2$, $P_3$, $P_4$, $P_5$ and $P_6$ correspond to increments 134, 154, 176 and 197, 220, 240 and 237, respectively. Typically, only 130 increments worth of pressure measurements are analyzed following $P_A$ which corresponds to 1.1 seconds of sampling time. The local maxima of the remaining sequence are then averaged at step 144, producing the total pressure, $P_{TO}$, measured. Averaging step 144 reduces the error caused by the subdominant vibration. At step 146, an adjustment is made for pressure fluctuations in the fluid 34 to produce an adjusted pressure, $P_{AD}$, measurement, discussed more fully below. At step 148, the "tare" pressure, $P_{TA}$, is subtracted from the $P_{AD}$ pressure to obtain the net pressure, $P_N$, attributable to the load on the forks 24, from which the weight is calculated. At step 152, the weight is displayed and then the program determines whether the measurement is a tare pressure measurement at step 152. If so, the measurement is stored in memory 84 at step 154. A pressure measurement may be identified as tare pressure in response to a user depressing one of switches 92, indicating the same.

As mentioned above, to determine the weight of the load supported by forks 24, it is necessary to subtract the "tare" pressure, $P_{TA}$, from the adjusted pressure, $P_{AD}$. The tare pressure is typically determined by measuring the pressure associated with the forks 24 empty. This is achieved by moving the forks 24 at a constant velocity along the mast 20, as described above. To obtain accurate measurements, it is necessary that the "tare" be performed at the same velocity as the measurement for a load supported on the forks. To ensure the velocity of the forks 24s' movement occurs at the same velocity, valve elements 42 and 44 are placed in the fully opened position when actuated, and the motor 54 is maintained at a constant RPM, typically idling, while the pressure transducer 56 records pressure measurements. A problem encountered in this arrangement concerned pressure fluctuations in the hydraulic system, resulting from the movement of the pump valves and a reduction in the idling of motor 54 which drives pump 52. For example, while carriage 22 moves toward the sprockets 28, fluid 34 from reservoir 48 enters cylinder 30 via valve element 42 and aperture 36. This causes a slight pressure decrease in reservoir 48. Pump 52 requires a few moments to compensate for the pressure decrease by pumping fluid 34 from reservoir 50 into reservoir 48. It has been found that as much as a one pound per-square-inch per-second decay in pressure may be detected by pressure transducer 56. Thus, for any given force exerted on the fluid 34 by piston 32, a plurality, or range of, pressure values may be detected by the pressure transducer 56, resulting in as much as a nine pound error in weight measurement.

Figure 7:
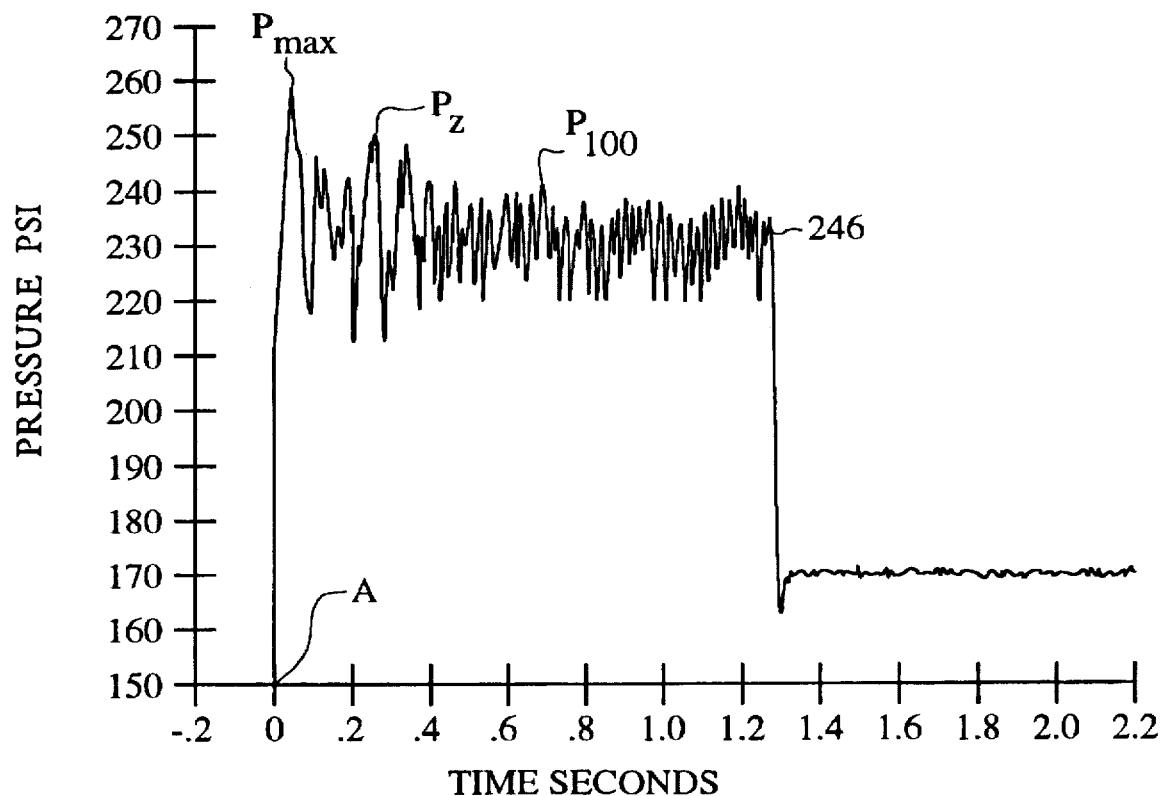
FIG. 7 is a graph of time versus pressure of sample measurements taken employing the present invention in the forklift shown in FIG. 1 during a tare lift.
Figure 8:
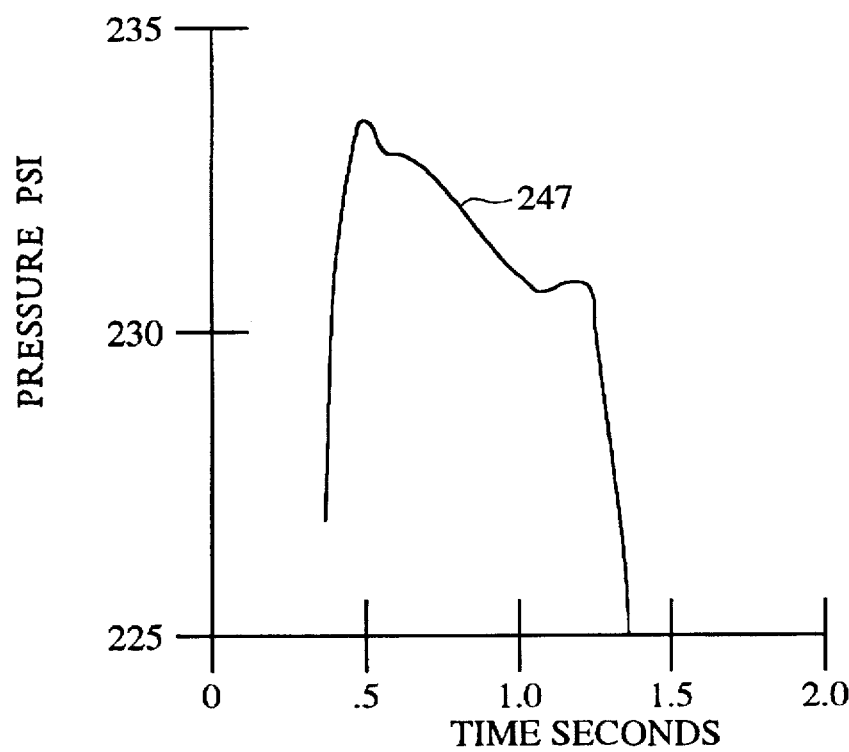
FIG. 8 is a graph of time versus pressure showing a rate of decay of pressure in the fluid of the hydraulic system shown in FIG. 2.

Referring also to FIG. 7, a process program employed to determine the decay rate of the pressure of the hydraulic fluid 34 is described. The decay rate is error correction used to calculate $P_{AD}$ at step 148. This program may be stored in program memory 84 along with the program described above with respect to FIGS. 5A–C and 6, or it may be incorporated into the same. The decay rate is typically measured during a "tare" lift, i.e., no load is supported by the forks 24 and shown as sequence 246. At step 146, a pressure measurement $P_Z$, sixty increments from $P_{max}$, is identified, and pressure measurements corresponding to ±sixty increments therefrom are averaged. An additional pressure measurement is identified at 100 increments from $P_Z$ and pressure measurements ±60 increments are averaged, providing a curve 247, shown in FIG. 8. The difference between the average at $P_Z$ and the average measurement, $P_{100}$ is measured. The lift time, $P_L$, between increment $P_Z$ and measurement $P_{100}$ is divided into the difference of averaged values to ascertain the decay rate in psi/sec. The lift time may be obtained by any conventional means in the digital art, for example, by using the internal clock of main processor 82. As shown from curve 247, a decay rate of approximately 2.67 psi/sec is demonstrated. Typically, the "tare" weight and the decay rate is determined before lifting a load by depressing switch 90, shown in FIG. 4. In this manner, the decay rate may be stored in memory and incorporated into the calculations of the weight of a load supported by forks 24, as shown in step 146 of FIG. 5C. This allows determining the weight of a load supported by the forks of a forklift with less than 1% error.

Figure 9A:
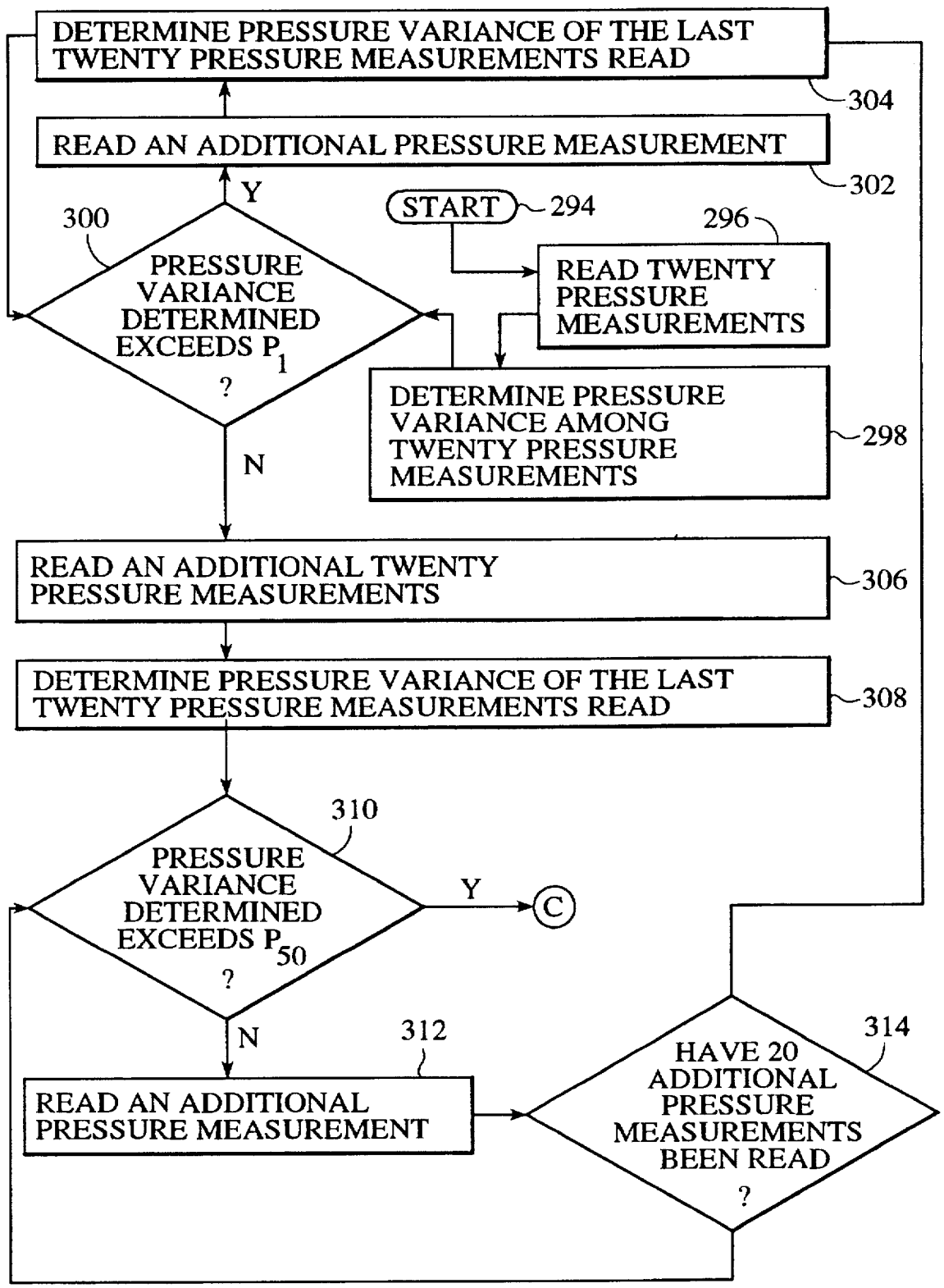
FIGS. 9A–9B is a flow chart showing the operation of a computer program for determining the pressure fluctuations of hydraulic fluid of the system shown in FIG. 2, in accord with the present invention.
Figure 9B:
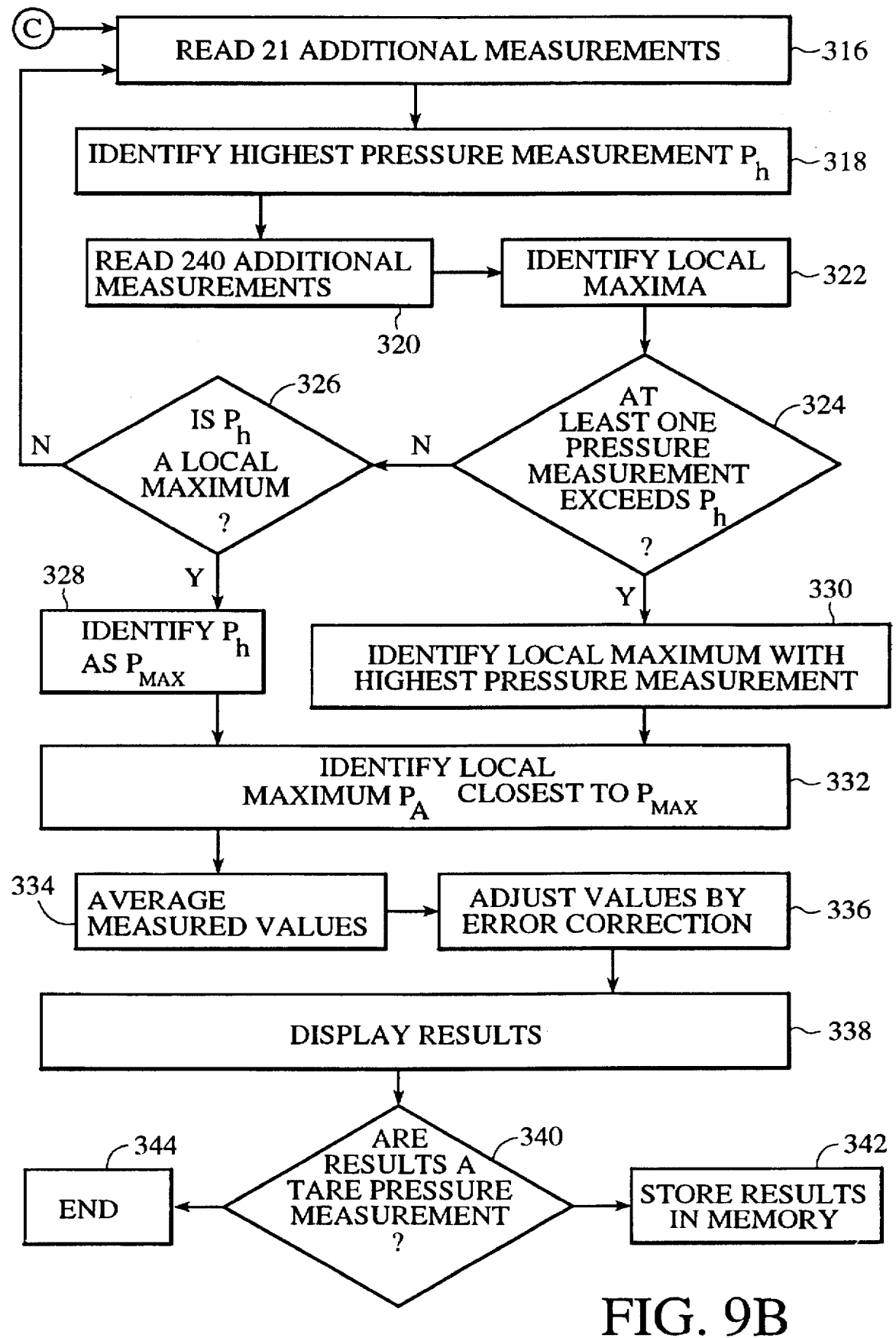

Referring also to FIGS. 9A and 9B, a second embodiment of the program is described. Instead of making real-time pressure measurements, the program determines the calculations after the pressure measurements have been made and stored in memory. Steps 394 to 316 are identical to steps 94 to 116 of the program described above with respect to FIGS. 5A–C. At step 318, the highest pressure measured, $P_h$, among the pressure measurements read in step 316 is identified. At step 120, 240 additional pressure measurements are measured at increments of time following the group comprising pressure measurements read at step 316. At step 322, the local maxima among the 240 pressure measurements is determined in the same fashion as described above with respect to FIGS. 5A–C. At step 324, it is determined whether a pressure measurement among the 240 read at step 320 exceeds $P_h$. If not, then the program determines whether $P_h$ is a local maximum at step 326, and if so, $P_h$ is identified as $P_{max}$ at step 328. If $P_h$ is not found to be a local maximum, then the program returns to step 316.

On the other hand, if at step 324, at least one pressure measurement exceeds $P_h$, the program continues to identify the local maximum having the highest pressure measurement as $P_{max}$, at step 330. After $P_{max}$ is identified, the program proceeds with steps 332, 334, 336, 338, 340, 342 and 344, which are identical to steps 142, 144, 146, 148, 150, 152 and 154 with respect to FIG. 5.

I claim:

1. A lifting device, comprising:

a frame;

a load bearing member operationally connected to said frame for movement relative thereto;

a hollow cylinder housing a piston and hydraulic fluid, said piston operationally connected to said load bearing member, with said hydraulic fluid disposed between said piston and one end of said housing, said piston imparting a force upon said fluid proportional to a weight associated with said load bearing member;

transducer means, in fluid communication with said hydraulic fluid, for measuring a pressure of said hydraulic fluid for a period of time and creating electrical signals corresponding thereto, defining a sequence of pressure measurements, with said pressure being related to said force;

accelerometer means, in data communication with said transducer means, for identifying from said sequence of pressure measurements, a point in said sequence at which an acceleration of said load bearing member has ceased, with the pressure measurements associated with said sequence and following said point defining a remaining sequence;

processing means, in data communication with said accelerometer means, for determining said weight from said remaining sequence; and display means, in data communication with said processing means, for producing a visual representation of said weight.

2. The device as recited in claim 1 further including a filtering means, in data communication with said transducer means, for attenuating electrical signals having a frequency within a predetermined range.

3. The device as recited in claim 1 wherein said electrical signals correspond to a plurality of pressure measurements obtained during a period of time, with said accelerometer means including a first sub-routine of a program stored in a memory to be operated on by a processor, determining, from said plurality of pressure measurements, a maximum pressure measured.

4. The device as recited in claim 3 wherein said accelerometer means includes positioning means for ascertaining when said load bearing member is stationary.

5. The device as recited in claim 4 wherein said positioning means includes a second sub-routine of a program stored in a memory to be operated on by a processor to determine, from a first subset of said plurality of pressure measurements, a variance of pressure among said subset not exceeding a predetermined value.

6. The device as recited in claim 1 wherein said accelerometer means includes sensing means for determining the presence of a load on said load bearing member.

7. The device as recited in claim 6 wherein said electrical signals correspond to a plurality of pressure measurements obtained during a period of time, with said sensing means including a third sub-routine of a program stored in a memory to be operated on by a processor, determining, from a second subset of said plurality of pressure measurements, a pressure measurement among said second subset exceeding a specified value.

8. The device as recited in claim 1 wherein a pressure decay is associated with said hydraulic fluid so that said force is represented by a range of pressure levels, and further including means for measuring and nulling said pressure decay, thereby reducing a number of pressure levels representing said force.

9. The device as recited in claim 1 wherein said housing includes an aperture, with said hydraulic fluid disposed between said piston and said aperture and further including control means, in fluid communication with said hydraulic fluid, for regulating ingress and egress of said hydraulic fluid with respect to said aperture, said control means includes a means for regulating movement of said load bearing member at a constant speed, thereby ensuring a portion of movement with respect to said frame occurs at said constant speed.

10. A hydraulic lifting device, comprising:

a frame;

load bearing members operationally connected to said frame for movement relative thereto;

a hollow cylinder housing a piston and hydraulic fluid, said piston operationally connected to said load bearing members, with said hydraulic fluid disposed between said piston and one end of said housing having an aperture, said piston imparting a force upon said hydraulic fluid related to a weight associated with said load bearing members;

transducer means, in fluid communication with said aperture, for measuring a pressure of said hydraulic fluid and creating electrical signals corresponding to a plurality of pressure measurements obtained during a period of time, each of said plurality of measurements being proportional to said force and associated with a unique increment of said period, defining a sequence of pressure measurements, said sequence of pressure measurements being stored in a first memory;

accelerometer means, in data communication with said transducer means, for identifying from said sequence of pressure measurements, an increment of time at which an acceleration of said load bearing members has ceased, with the pressure measurements associated with said sequence and following said increment of time defining a remaining sequence;

processing means, in data communication with said accelerometer means, for determining said weight from said remaining sequence; and display means, in data communication with said processing means, for producing a visual representation of said weight.

11. The device as recited in claim 10 further including a filtering means, in electrical communication with said processing means, for attenuating electrical signals having a frequency within a predetermined range, wherein said filtering means averages said plurality of pressure measurements associated with increments separated by a predetermined range of time.

12. The device as recited in claim 11 further including control means, in fluid communication with said hydraulic fluid, for regulating ingress and egress of said hydraulic fluid with respect to said aperture, said control means includes a means for regulating movement of said load bearing members at a constant speed, thereby ensuring a portion of movement with respect to said frame occurs at said constant speed.

13. The device as recited in claim 12 wherein said accelerometer means includes both positioning means for ascertaining when said load bearing members are stationary and sensing means for determining the presence of a load on said load bearing members, said positioning means including a first sub-routine of a program stored in a second memory to be operated on by a processor to determine whether a first subset of measurements stored in said first memory include a pressure variance less than 7 pounds per-square-inch, and said sensing means including a second sub-routine of said program stored in said second memory to be operated on by said processor, determining, from a second subset of said measurements stored in said first memory, whether a pressure among said second subset exceeds a specified value.

14. A method for determining the weight of a load placed on a hydraulic lifting device of the type having a frame, a hydraulic lift system operable to move a load carriage, including fork members, with respect to said frame to raise and lower a payload associated with said forks, a control means for regulating the operation of the lifting device, a transducer means for measuring a pressure of fluid associated with said hydraulic system and creating electrical signals corresponding thereto with said pressure being proportional to a weight of said payload, and processing means, electronically coupled to said transducer means, for processing said electrical signals, said method comprising the steps of:

engaging said payload with said fork members;

lifting said payload with said fork members, thereby moving said payload with respect to said frame;

measuring a pressure of said fluid for a period of time obtaining a plurality of pressure measurements, each of said plurality of measurements being associated with a unique increment of said period, forming a sequence of pressure measurements;

identifying, from said sequence of pressure measurements, an increment of time at which an acceleration of said fork members has ceased, with said sequence of pressure measurements following said increment defining a remaining sequence;

determining from said remaining sequence, a weight of said payload; and visually displaying said weight measured.

15. The method as recited in claim 14 wherein said identifying step further includes a step of ascertaining, from said sequence of pressure measurements, when said fork members are stationary.

16. The method as recited in claim 15 wherein said identifying step further includes a step of distinguishing, from said sequence of pressure measurements, the lifting of a load with said fork members from a tare lift.

17. The method as recited in claim 16 wherein said measuring step includes the steps of identifying, among said sequence of pressure measurements, a highest pressure $P_{max}$; identifying the next highest pressure $P_A$ following $P_{max}$ and identifying a plurality of local maxima following $P_A$.

18. The method as recited in claim 17 where said plurality of local maxima have a periodicity associated therewith and said $P_A$ measured does not occur less than 0.1 second following $P_{max}$, with said periodicity of each of said plurality of local maxima not being less than 0.1 second, with $P_A$ and said plurality of local maxima comprising said remaining sequence.

19. The method as recited in claim 18 further including the step of obtaining an average value of the pressure measurements comprising said remaining sequence.

20. The method as recited in claim 16 including the step of identifying 20 pressure measurements not having a pressure variance among them of greater than 7 pounds per-square-inch and identifying a pressure sample $P_{50}$ measuring at least 50 pounds per square in a measurement of pressures following said 20 pressure measurements.

21. The method as recited in claim 20 further including the step of recognizing, within 60 measurements of pressure following $P_{50}$, a temporary maximum pressure $P_h$, with said recognizing step further including the step of finding a pressure measurement exceeding $P_h$, among a subsequent plurality of pressure measurements.

22. A lifting device, comprising:

a frame;

load bearing members operationally connected to said frame for movements relative thereto;

a hollow cylinder housing a piston and hydraulic fluid, said piston operationally connected to said load bearing members, with said hydraulic fluid disposed between said piston and one end of said housing having an aperture, said piston imparting a force upon said fluid proportional to a weight associated with said load bearing members;

control means, in fluid communication with said hydraulic fluid, for regulating ingress and egress of said hydraulic fluid with respect to said aperture;

transducer means, in fluid communication with said aperture, for measuring a pressure of said hydraulic fluid and creating electrical signals corresponding to said pressure, said hydraulic fluid being associated with a pressure decay so that said force is represented by a range of pressure levels;

processing means, electronically coupled to said transducer means, for processing said electrical signals to produce information corresponding to hydraulic pressure, said information including said weight, said processing means including means for measuring and hulling said pressure decay, thereby reducing a number of pressure levels representing said force; and display means, coupled to receive said information, for producing a visual representation of said weight.

23. The device as recited in claim 22 wherein said processing means includes an accelerometer means for determining when an acceleration of said load bearing members has ceased.

24. The device as recited in claim 23 wherein said electrical signals correspond to a plurality of pressure measurements obtained during a period of time, with said accelerometer means including a sub-routine of a program stored in a memory to be operated on by a processor and determine, from said plurality of pressure measurements, a lift time $T_L$ from a start of said lift to measurement of $P_A$, with $P_A$ defined as the next highest pressure measurement following a highest pressure measurement $P_{max}$.

25. A lifting device, comprising:

a frame;

a load bearing member operationally connected to said frame for movement relative thereto;

a hollow cylinder housing a piston and hydraulic fluid, said piston operationally connected to said load bearing member, with said hydraulic fluid disposed between said piston and one end of said housing, said piston imparting a force upon said fluid proportional to a weight associated with said load bearing member;

means, in fluid communication with said hydraulic fluid, for measuring a plurality of pressure measurements of said hydraulic fluid, during a period of time, each of which is associated with a unique increment of said period, defining a sequence of pressure measurements;

means, in data communication with said measuring means, for identifying, from said plurality of pressure measurements, an increment of time at which an acceleration of said load bearing member has ceased, with pressure measurements of said sequence of pressure measurements following said increment defining a remaining sequence; and means, in data communication with said identifying means, for determining from said remaining sequence, said weight.

26. The device as recited in claim 25 wherein said measuring means creates a plurality of electrical signals corresponding to said plurality of pressure measurements and further including a filtering means, in data communication with said measuring means, for attenuating electrical signals having a frequency within a predetermined range.

27. The device as recited in claim 25 wherein said identifying means includes a first sub-routine of a program stored in a memory to be operated on by said determining means to ascertain, from said plurality of pressure measurements, a maximum pressure measured.

28. The device as recited in claim 25 wherein said identifying means includes positioning means for ascertaining when said load bearing member is stationary, with said positioning means including a sub-routine of a program stored in a memory to be operated on by said determining means to indicate, from a first subset of said plurality of pressure measurements, a variance of pressure among said subset not exceeding a predetermined value.

29. The device as recited in claim 25 wherein said housing includes an aperture, with said hydraulic fluid disposed between said piston and said aperture and further including control means, in fluid communication with said hydraulic fluid, for regulating ingress and egress of said hydraulic fluid with respect to said aperture, said control means including a means for regulating movement of said load bearing member at a constant speed, thereby ensuring a portion of movement with respect to said frame occurs at the same speed.

* * * * *

UNITED STATES PATENT AND TRADEMARK OFFICE
CERTIFICATE OF CORRECTION

PATENT NO.   : 5,666,295
DATED        : September 9, 1997
INVENTOR(S)  : Robert W. Bruns It is certified that error appears in the above-identified patent and that said Letters Patent is hereby corrected as shown below:

Claim 24, col. 14, line 4, after the second occurrence of "lift" insert -- time --.

Signed and Sealed this

Tenth Day of March, 1998

Attest:

BRUCE LEHMAN

*Attesting Officer*       *Commissioner of Patents and Trademarks*